Feb. 23, 1960 W. C. WEIGLE ET AL 2,926,100
METHOD OF PRODUCING DECORATIVE SHEET MATERIAL
Filed Dec. 24, 1956
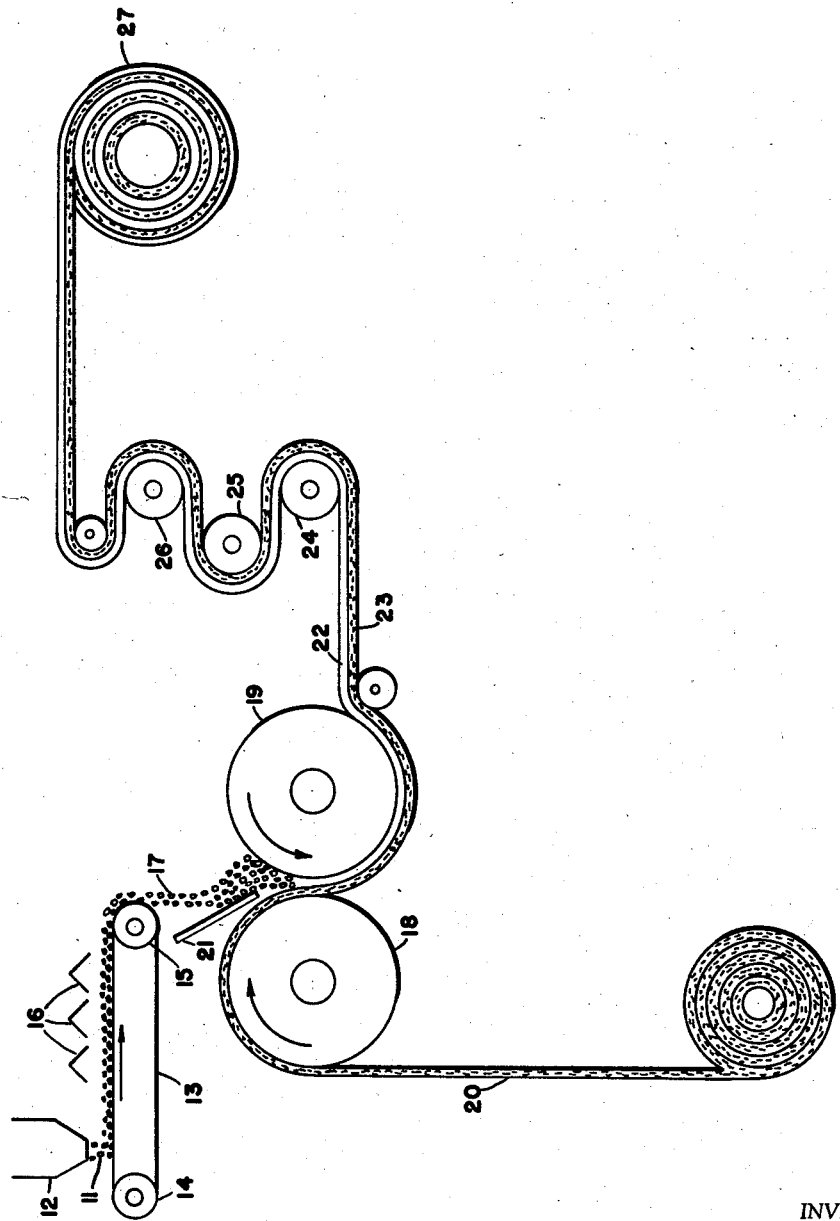
INVENTORS.
WILLIAM C. WEIGLE
WALTER E. BENEDICT
BY JOSEPH F. DOBRY
ATTORNEY 2,926,100
Patented Feb. 23, 1960

2,926,100

METHOD OF PRODUCING DECORATIVE SHEET MATERIAL

William C. Weigle, Philadelphia, Walter E. Benedict, Newtown, and Joseph F. Dobry, Langhorne, Pa., assignors to Congoleum-Nairn Inc., Kearney, N.J., a corporation of New York Application December 24, 1956, Serial No. 630,198

12 Claims. (Cl. 117—21)

The present invention is a continuation-in-part of my co-pending invention bearing Serial Number 294,916, filed June 21, 1952, now abandoned.

This invention relates to a method of producing decorative sheet materials for use as surface coverings for floors, walls, and the like.

The manufacture of decorative sheet material wherein a layer of decorative and wear-resisting composition is laminated to a backing is well known. For many years, linoleum was the principal product of this type. However, in recent years thermoplastic resinous compositions, such as vinyl resins, have been developed which have properties which are in some respects superior to linoleum for use as floor coverings, countertops, wall coverings and other similar uses. These thermoplastic compositions are superior to linoleum in their wearing qualities and their resistance to alkalies and acids. Moreover, they can be compounded with pigments to produce brighter and clearer colors than heretofore possible.

Such products can be produced by consolidating thermoplastic composition between calender rolls and thereafter laminating the sheet to a felt backing. This process tends to be costly since the step of laminating the thermoplastic sheet to the felt backing requires additional processing equipment and labor and also since adhesives must be used in order to obtain a good bond between the thermoplastic sheet and the felt.

It is an object of the invention to provide a method of producing a decorative sheet material comprising a thermoplastic layer bonded to a felt backing characterized by minimum cost. A further object of the invention is to provide a means for producing a felt-backed thermoplastic sheet material wherein no adhesive is required to bond the thermoplastic sheet to the felt backing. Other objects and the advantages of the invention will appear hereinafter.

In accordance with the invention, decorative sheet material for use as a surface covering is produced by passing an impregnated felt backing and particles of thermoplastic synthetic resinous composition simultaneously to the nip between two calender rolls wherein the composition is sheeted and bonded to an impregnated felt backing in a single pass between the calender rolls.

The invention will be described with relation to the drawing which is a schematic representation of a typical arrangement for carrying out the method of the present invention.

Particles 11 of thermoplastic resinous composition fall from a storage hopper 12 onto a continuous conveyor belt 13 which passes around and is driven by rolls 14, 15. The particles are heated by infra-red lamps 16 and the heated particles 17 pass from the conveyor belt and fall into the nip between two heated calender rolls 18, 19. An impregnated felt sheet 20 passes around a portion of the circumference of the roll 18 and comes into engagement with the heated particles in the nip between the rolls. An adjustable baffle plate 21 controls the supply of the particles into the nip.

A decorated thermoplastic sheet 22 is simultaneously formed and laminated to the impregnated felt backing by the heat and pressure of the calendering step. The product then passes over cooling cans 24, 25, 26 to a storage roll 27.

The resinous compositions which are used in producing decorative sheet material in accordance with the invention are thermoplastic resinous compositions which require no curing, vulcanization or other prolonged heat or chemical treatment to produce a finished product. The thermoplastic compositions are thus to be distinguished from linoleum, rubber, and thermosetting resins. Suitable thermoplastic resins include polymerized vinyl chloride, vinyl chloride-vinyl acetate copolymer, vinyl chloride-vinylidene chloride copolymer, polyvinyl acetate, polymers of acrylic and methacrylic acids and derivatives of these acids, polyacrylonitrile, polyurethanes, polyethylene, polystyrene, polybutylene, copolymers and mixtures of the above with each other and the like. Thermoplastic polyvinyl resinous compositions such as are disclosed in U.S. Patents 2,558,378 and 2,590,032 which issued on June 26, 1951, and March 18, 1952, respectively, to R. K. Petry are useful. Polymers of vinyl chloride or vinyl chloride-vinyl acetate copolymer containing from 80 percent to 98 percent by weight vinyl chloride are particularly effective.

The synthetic resinous material is plasticized by any of a number of plasticizers or mixture of plasticizers such as tricresyl phosphate, dibutyl phthalate, dioctyl phthalate, dicapryl phthalate, dibutyl sebacate, dibutoxy ethyl phthalate, butadiene-acrylonitrile copolymer, ethylene glycol copolymers, alkyd resins which have plasticizing properties, chlorinated paraffin, and the like. The plasticized synthetic resinous binder is mixed with suitable fillers and pigments such as calcium carbonate, clay, wood flour, talc, asbestos, various minerals and vegetable fibers, and the like. Generally, it is preferable to employ a substantial quantity of fibrous filler, such as short asbestos fiber. Typical formulations comprise from about 15 to about 50 percent resin, about 25 to about 75 percent filler, and about 5 to about 25 percent plasticizer.

The thermoplastic resin-containing composition in accordance with the invention preferably has a softening point of between 200° F. and 350° F. Compositions having softening points of between 250° F. and 300° F. are particularly effective. Throughout the specification and claims, the term "softening point" is the temperature at which the composition becomes soft, pliable and of a putty-like consistency. Under these conditions it is readily workable and may be formed into a smooth unitary sheet between calender rolls. Compositions in accordance with the invention, although being soft and deformable at elevated temperatures, are firm and relatively hard at room temperatures.

The thermoplastic composition can be sheeted in a press or between calender rolls and then broken into granules or pieces which can vary in size from about $\frac{1}{16}$ inch to about 1 inch in average face dimension and from about 0.01 to about 0.06 inch in thickness. Alternately, the composition can be extruded in rod shape and the rods sliced or broken into granules. In accordance with the invention, the thermoplastic composition, in the form of particles, granules, or pieces, is heated before being fed to the calender where the composition is sheeted and bonded to the felt backing sheet. It has been found that if the composition is heated to about its softening point temperature, that is, within the range of 50° F. above and below its softening point temperature, satisfactory sheeting of the composition can be effected in accordance with the invention.

In order to withstand the strains imposed on the backing material by the simultaneous sheet formation and lamination process, the backing should possess a high tensile strength and resistance to rupture at elevated temperatures. Felt backing sheets which have a tensile strength of 100 pounds or more at 200° F. and higher for a strip one inch in width have been found to be suitable for use in the present invention. This tensile strength is conveniently determined by subjecting a one inch strip of the backing material to tension until it breaks, and the strength is referred to as the weight required to break the strip. It is preferred that the felt backing sheet have a tensile strength of 100 pounds or more at the softening point temperature of the composition being calendered.

Various fibrous materials can be used in the formation of backing sheets for use in accordance with the invention and can be of animal, vegetable or mineral origin. It is preferred that cellulose fibers be used as derived from such sources as cotton or other rag material, wood pulp, including both ground wood and chemical wood pulp, paper boxes or mixtures thereof in any proportion. The web can also contain fillers such as wood flour. The fibers are preferably sheeted to form a felt backing sheet using a Fourdrinier or cylinder paper machine. The thickness of the felt backing will normally be from 0.02 to 0.06 inch and preferably from 0.025 to 0.045.

Fibrous webs made up of felted cellulose fibers do not themselves have sufficient strength to be used in the present invention. Even felts prepared from 100 percent rag stock fall far short of having a tensile strength of 100 pounds per inch of width at temperatures exceeding 200° F. Therefore, in accordance with the invention, the felt backing sheet must be strengthened by impregnation with a heat-resisting, stable, strengthening binder. It has been found that thermoplastic or elastomeric resins are particularly effective as impregnants in imparting the necessary strength to felt backing sheets for use in the invention. Suitable strengthening impregnants for use in the invention are made by polymerizing compounds having from 2 to 10 carbon atoms which contain a vinyl group. Such resins as polyvinyl acetate, polyvinyl chloride, butadiene-acrylonitrile copolymer, butadiene-styrene copolymer, polymerized chloroprene, and the like are useful.

The felt is impregnated with from about 3 to about 25 percent of the strengthening impregnant. Polymerized chloroprene has been found to be a particularly effective impregnant for use in the invention and when used in an amount of from 5 to 20 percent of the felt, imparts unusual strength properties to the sheet. The impregnant can comprise up to 25 percent of plasticizers, such as petroleum resins, coumarone-indene resins, rosin, esterified tall oil and the like. The amount of impregnant used in any particular case must be sufficient to yield an impregnated felt having the required tensile strength.

Saturants, such as asphalt, which have been widely used as impregnants for backing sheets in the surface covering field are not satisfactory for use in the invention since asphalt impregnated felt fails to have sufficient strength at elevated temperatures. When the simultaneous sheeting and lamination to felt of thermoplastic composition is attempted in accordance with the invention using asphalt saturated felt, the felt not only tears and breaks due to insufficient strength, but in addition, the asphalt migrates from the felt sheet and causes sticky deposits upon the back roll of the calender.

A typical felt for use in the invention impregnated with polymerized chloroprene, when compared with conventional asphalt saturated felt of the same thickness, gave the following results on testing:

| Temp. of Felt Samples | Tensile Strength, Lbs. per 1 Inch Strip | | Mullen Bursting Strength, Lbs. per Sq. Inch | |
|---|---|---|---|---|
| | Chloroprene Polymer Felt | Asphalt Saturated Felt | Chloroprene Polymer Felt | Asphalt Saturated Felt |
| | Lbs. | Lbs. | Lbs. | Lbs. |
| 90° F | 140.3 | 99.0 | 131.6 | 104.0 |
| 220° F | 128.0 | 47.0 | 85.3 | 37.3 |
| 270° F | 117.3 | 37.8 | 72.3 | 35.0 |
| 320° F | 102.3 | 34.2 | 55.3 | 26.0 |

These figures demonstrate not only the superior tensile properties of felt impregnated with a strengthening impregnant in accordance with the invention, but also the excellent resistance to bursting as indicated by the high Mullen bursting strength values. Satisfactory impregnated felts in accordance with the invention not only have a tensile strength in excess of 100 pounds per inch at 200° F. but also a Mullen bursting strength in excess of 50 pounds per square inch.

In the production of products in accordance with the invention using resinous composition and impregnated felt of the type described above, a web of felt is passed to a two-roll calender, both rolls of which are heated. It is preferred that each roll of the calender be maintained at a temperature of about the softening point temperature of the composition being calendered, that is, within the range of 50° F. above and below its softening point temperature. The felt engages the back roll of the calender for a substantial portion of its circumference so that the felt is preheated before it reaches the nip between the rolls.

The resinous composition is preheated as described above and is fed to the nip between the calender rolls and into engagement with the preheated web of impregnated felt in amounts just sufficient to insure the formation of a unitary sheet during passage of the composition through the nip. It is preferable to avoid the accumulation of excess resinous composition on the felt for any substantial distance before it reaches the nip between the rolls. This is effected by means of a baffle plate located adjacent to the nip. In the nip, the web and the composition are subjected to intense pressure and temperature sufficient to cause the composition to become bonded together into a smooth unitary sheet and to be simultaneously, intimately and permanently bonded to the felt backing.

The spacing of the rolls of the calender and the thickness of the web of backing material serve to determine the thickness of the layer of resinous composition in the finished product. However, when the felt or backing is relatively thick, compressible or resilient, the spacing of the rolls can be little if any greater than the thickness of the felt itself. In a typical instance wherein the thickness of the felt backing was initially .040 inch, the spacing of the calender rolls was .045 inch. After the calendering of the resinous composition onto the backing, the resulting product was .047 inch thick due to partial recovery and expansion of the composition and backing. The felt backing was reduced to .028 inch in thickness and the resinous layer was .019 inch in thickness. The thickness of the finished product also varies to some extent with the speed of operation of the calender since the duration of pressure application when the calender rolls and material travel slowly is, of course, greater than when the rolls travel at higher speeds. In general, calendering speeds of about 10 to 50 feet per minute are satisfactory and speeds of 30 to 40 feet per minute are preferred.

The product leaving the calender rolls can be held in engagement with one of the rolls for a short period as the roll rotates so as to insure fluxing and intimate bonding of the resinous composition to the backing. After leaving the calender rolls, the edges of the sheet can be trimmed and, if desired, the product after cooling somewhat or when cold can be subjected to a planishing operation to further smooth and polish the surface of the resinous material. The resulting product is then ready for immediate packaging, shipping or use without any curing, stoving, vulcanizing or further treatment.

The process of the present invention thus can be carried out speedily and economically without resorting to any further laminating operations, and a more intimate and direct bond is established between the resinous decorative layer and the backing since no adhesive layer or intermediate bonding layer need be present in the finished product. In fact, when the felt is provided with a vinyl resin face paint and the resinous composition consists of or contains a vinyl resin, the face paint can actually flux into and become integral with the resinous composition while bonded to the fibers of the felt.

The resinous composition can, of course, be pigmented or colored to produce attractive and brilliant designs and the granules or pieces of resinous composition fed to the calender can be of mixed colors to produce a mottled, granite-like or variated design and the composition itself can previously have been calendered before it is broken up or granulated for use in the present process so that each individual piece can be multicolored. The composition also can be laminated before being broken up for calendering.

Example I

A resinous composition containing 70 percent of filler and 30 percent of binder with 35 percent of the binder consisting of plasticizers is produced as follows:

15 parts by weight of polyvinyl chloride, 5 parts of polyvinylidene chloride, 7 parts of tricresyl phosphate and esters of phthalate acid, 1 part of alkyd resin and 2 parts of lubricant or stabilizers including calcium stearate, stearic acid and lead carbonate, are mixed together in a Banbury mixer. About 40 parts by weight of asbestos shorts, 28 parts of precipitated calcium carbonate and 2 parts of pigments are added and the materials are mixed together at a temperature of about 340° F. to 350° F. for 15 minutes. The composition is then sheeted and when cooled, it is broken up into granules or pieces about ¼ inch in their greatest dimension. These pieces are suitable for directly calendering onto an impregnated felt backing in accordance with the invention.

Example II

A resinous composition containing 66 percent of filler and 34 percent of binder of which 35 percent consists of plasticizers can be produced by substituting in place of the asbestos shorts used as fillers in the preceding example, fillers consisting of 12 parts of wood flour (80 mesh), 24 parts of precipitated calcium carbonate and 2 parts of dolomite. The mixture thus produced is handled in the same manner as in Example I to produce a granulated resinous composition suitable for use in producing floor coverings in accordance with the invention.

Example III

A resinous composition containing 55 percent of filler and 45 percent of binder containing 35 percent of plasticizer may be produced as follows:

Polyvinyl chloride in an amount of 160 parts by weight is mixed with 87 parts by weight of a mixture of tricresyl phosphate and dioctyl phthalate. To the mixture are added 280 parts of precipitated calcium carbonate together with 3 parts of lubricant including calcium stearate and stearic acid, 7 parts of a stabilizer such as white lead, 6 parts of carbon black and 7 parts of ethylene glycol polymers. These materials are mixed together in a Banbury mixer for 9 minutes at 325° F. and are then sheeted and granulated to reduce the resinous material to a form suitable for use in calendering the composition onto a backing.

Example IV

The granules of resin composition produced as described in Example III which have a softening point of about 275° F. were preheated to a temperature of 275° F. and passed to the nip between two rolls of a calender. A felt sheet having fibers composed of 57 percent corrugated boxes and 33 percent cotton rags was impregnated with 8 percent polymerized chloroprene. This felt was passed over about 180° of the circumference of the back roll of the two-roll calender, both rolls of which were maintained at temperatures of 275° F. The granules of composition were simultaneously formed into a smooth unitary sheet and laminated to the backing material in one pass between the calender rolls.

Any departure from the above description which conforms to the present invention is intended to be included within the scope of the claims.

We claim:

1. A method of producing decorative sheet material which comprises the steps of heating a layer of impregnoted felt backing by passing said backing over a heated back roll of a two-roll calender and passing said heated backing together with heated particles of vinyl composition having a softening point of between 200° F. and 350° F. to the nip between said heated back roll and a heated front roll of said calender, said particles and said rolls being at temperatures of about the softening point temperature of said composition, thereby simultaneously forming the composition into a smooth thin integral layer and bonding it to the backing at said nip, said composition comprising 15 percent to 50 percent vinyl resin, 25 percent to 75 percent filler and 5 percent to 25 percent plasticizer, said impregnated felt backing having a tensile strength at the softening point temperature of said composition of at least 100 pounds for a strip one inch in width by being impregnated with from about 3 percent to about 25 percent of its weight of a strengthening impregnant prepared by polymerizing compounds having from 2 to 10 carbon atoms which contain a vinyl group.

2. The method of claim 1 wherein said strengthening impregnant is polymerized chloroprene.

3. The method of claim 2 wherein said vinyl resin is selected from the group consisting of polymerized vinyl chloride and copolymers of vinyl chloride.

4. A method of producing decorative sheet material which comprises the steps of heating a layer of impregnated felt backing having a tensile strength at 200° F. of at least 100 pounds for a strip one inch in width, said impregnated backing comprising from 90 percent to 95 percent felted cellulose fibers and from 10 percent to 5 percent polymerized chloroprene uniformly distributed within said backing, and passing the heated backing together with heated particles of vinyl composition having a softening point of between 250° F. and 300° F. to the nip between two heated rolls of a calender, said particles and said rolls being at temperatures of about the softening point temperature of said composition, thereby simultaneously forming the composition into a smooth thin integral layer and bonding it to the backing at said nip.

5. A method of producing decorative sheet material which comprises the steps of heating a layer of impregnated felt backing having a tensile strength at 200° F. of at least 100 pounds for a strip one inch in width, said impregnated backing containing about 92 percent felted cellulose fibers and about 8 percent polymerized chloroprene uniformly distributed within said backing, and passing the heated backing together with heated particles of vinyl composition having a softening point of between 250° F. and 300° F. to the nip between two heated rolls of a calender, said particles and said rolls being at temperatures of about the softening point temperature of said composition, thereby simultaneously forming the composition into a smooth thin integral layer and bonding it to the backing at said nip, said composition comprising 15 percent to 50 percent vinyl resin, 25 percent to 75 percent filler and 5 percent to 25 percent plasticizer, said vinyl resin being selected from the group consisting of polymerized vinyl chloride and copolymers of vinyl chloride.

6. A method of producing decorative sheet material useful as a covering for floors and walls which comprises the steps of heating a flexible sheet of felted fibrous backing material impregnated with a heat-resisting stable resinous strengthening impregnant in an amount sufficient to impart to said sheet a tensile strength at 200° F. of at least 100 pounds for a strip 1 inch in width and passing the heated sheet together with heated particles of thermoplastic resinous composition having a softening point of between 200° F. and 350° F. to the nip between two heated rolls of a calender, said particles and said rolls being at temperatures of about the softening point temperature of said composition, thereby simultaneously forming said heated particles of thermoplastic composition into a smooth thin integral decorative layer and bonding it to said heated sheet at said nip.

7. A method of producing decorative sheet material useful as a covering for floors and walls which comprises the steps of heating a sheet of felted fibrous backing material by passing said sheet over a heated back roll of a two roll calender, said sheet being impregnated with about 3 percent to about 25 percent of its weight of a strengthening impregnant prepared by polymerizing compounds having from 2 to 10 carbon atoms which contain a vinyl group, said sheet having a tensile strength at 200° F. of at least 100 pounds for a strip 1 inch in width and passing said heated sheet together with heated particles of thermoplastic resinous composition having a softening point of between 200° F. and 350° F. to the nip between said heated back roll and a heated front roll of said calender, said heated particles and said rolls being at temperatures of about the softening point temperature of said composition, thereby simultaneously forming said heated particles into a smooth thin integral decorative layer and bonding it to said heated sheet at said nip.

8. A method of producing decorative sheet material useful as a covering for floors and walls which comprises the steps of heating a sheet of felted fibrous backing material by passing said sheet over a heated back roll of a two roll calender, said sheet being impregnated with polymerized chloroprene in an amount between about 3 percent and about 25 percent of the weight of said sheet sufficient to impart to said sheet a tensile strength at 200° F. of at least 100 pounds for a strip 1 inch in width, and passing said heated sheet together with heated particles of thermoplastic resinous composition having a softening point of between 200° F. and 350° F. to the nip between said heated back roll and a heated front roll of said calender, said heated particles and said rolls being at temperatures of about the softening point temperature of said composition, thereby simultaneously forming said heated particles into a smooth thin integral decorative layer and bonding it to said heated sheet at said nip.

9. A method of producing decorative sheet material useful as a covering for floors and walls which comprises the steps of heating a flexible sheet of felted fibrous backing material by passing said sheet over a heated back roll of a two roll calender, said sheet being impregnated with a heat-resisting stable resinous strengthening impregnant in an amount sufficient to impart to said sheet a tensile strength at 200° F. of at least 100 pounds for a strip 1 inch in width, and passing the heated sheet together with heated particles of vinyl resinous composition having a softening point of between 200° F. and 350° F. to the nip between said heated back roll and a heated front roll of said calender, said heated particles and said rolls being at temperatures of about the softening point temperature of said composition, thereby simultaneously forming said heated particles into a smooth thin integral decorative layer and bonding it to said heated sheet at said nip.

10. A method of producing decorative sheet material useful as a covering for floors and walls which comprises the steps of heating a sheet of felted fibrous backing material by passing said sheet over a heated back roll of a two roll calender, said sheet being impregnated with a strengthening impregnant prepared by polymerizing compounds having from 2 to 10 carbon atoms which contain a vinyl group in an amount between about 3 percent and about 25 percent of the weight of said sheet sufficient to impart to said sheet a tensile strength at 200° F. of at least 100 pounds for a strip 1 inch in width, and passing the heated sheet together with heated particles of vinyl resinous composition having a softening point of between 200° F. and 350° F. to the nip between said heated back roll and a heated front roll of said calender, said heated particles and said rolls being at temperatures of about the softening point temperature of said composition, thereby simultaneously forming said heated particles into a smooth thin integral decorative layer and bonding it to said heated sheet at said nip.

11. A method of producing decorative sheet material useful as a covering for floors and walls which comprises the steps of heating a sheet of felted fibrous backing material by passing said sheet over a heated back roll of a two roll calender, said sheet being impregnated with polymerized chloroprene in an amount between about 3 percent and about 25 percent of the weight of said sheet sufficient to impart to said sheet a tensile strength at 200° F. of at least 100 pounds for a strip 1 inch in width, and passing said heated sheet together with heated particles of vinyl resinous composition having a softening point of between 200° F. and 350° F. to the nip between said heated back roll and a heated front roll of said calender, said heated particles and said rolls being at temperatures of about the softening point temperature of said composition, thereby simultaneously forming said heated particles into a smooth thin integral decorative layer and bonding it to said heated sheet at said nip.

12. A method of producing decorative sheet material useful as a covering for floors and walls which comprises the steps of heating a sheet of felted fibrous backing material by passing said sheet over a heated back roll of a two roll calender, said sheet being impregnated with a strengthening impregnant prepared by polymerizing compounds having from 2 to 10 carbon atoms which contain a vinyl group in an amount between about 3 percent and about 25 percent of the weight of said sheet sufficient to impart to said sheet a tensile strength at 200° F. of at least 100 pounds for a strip 1 inch in width, heating particles of vinyl resinous composition having a softening point temperature of between 200° F. and 350° F. to about the softening point temperature of said composition and applying said heated particles to said heated sheet at the nip between the heated back roll and a heated front roll of said calender, said rolls both being at temperatures of about the softening point temperature of said composition, thereby simultaneously forming said heated particles into a smooth, thin, integral decorative layer and bonding it to said heated sheet at said nip.

References Cited in the file of this patent

UNITED STATES PATENTS

| | | |
|---|---|---|
| 2,070,600 | Jenett | Feb. 16, 1937 |
| 2,306,046 | Duggan et al. | Dec. 22, 1942 |
| 2,368,475 | Kemmler | Jan. 30, 1945 |
| 2,605,514 | Shenaur et al. | Aug. 5, 1952 |